Jan. 1, 1929.

J. J. AURYNGER 1,697,258

STATIC CONDENSER

Filed April 15, 1926

John J. Aurynger Inventor

Patented Jan. 1, 1929.

1,697,258

UNITED STATES PATENT OFFICE.

JOHN J. AURYNGER, OF TAKOMA PARK, MARYLAND.

STATIC CONDENSER.

Application filed April 15, 1926. Serial No. 102,201.

The object of the invention is a condenser provided with plates having cup-shaped bosses formed by embossing the plates which make better electrical connections and decrease the number of movable parts. All spacing devices are eliminated. The vertical posts which hold the condenser plates in alignment are strengthened with the result that mechanical vibrations and electrical losses are lessened.

The invention is related to condensers in which the plates are welded to the vertical posts without the use of bolts and washers. The invention is also related to the tapering lugs cast on the grids of storage batteries. Other than a likeness of the bosses to the central orifice in the lugs on the grids, which is filled again with a fusible metal, the similarity ceases to exist.

This invention differs from tubular projections as in the case of the storage battery grids in which the lugs are tapering and telescope one within the other. In this invention the bosses can be made only by embossing the plates of uniform thickness, are perpendicular to the plate, do not taper, and have the bottoms of the depressions more or less removed.

Figure 1:
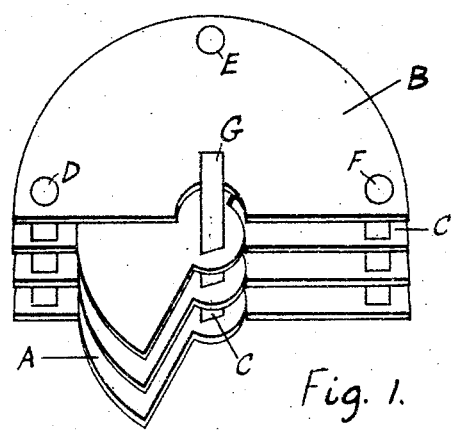
Figure 2:
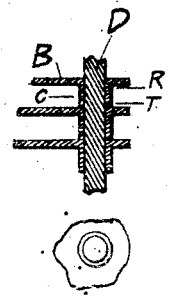
Figure 3:
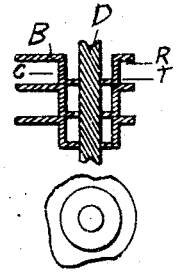
Figure 4:
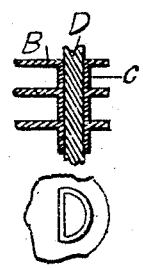
Figure 5:
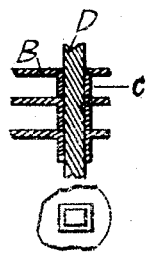

Referring to the drawing by figures, Fig. 1 represents a variable condenser consisting of two component groups having a plurality of horizontal parallel metallic plates. The figure is isometric with respect to the two sets of plates separated by a dielectric medium. Fig. 2 is a cross-section and plan views of one of the vertical posts showing the circular cup-shaped bosses "C" of one of the group of plates as "B". Fig. 3 is a similar section and plan of a modified form of boss or projection and has no particular value. Fig. 4 is a section and plan of another modification of the boss or projection and is of special value in the rotor group of plates in which there is only one vertical post to hold the plates in alignment. Fig. 5 is a section and plan of another modification of the boss or projection and is a departure from the circular bosses.

Referring to the drawing by letter, in Fig. 1 the component plates consist of two groups of metallic plates A and B separated by a dielectric medium as air or oil or mica. The plates are made of a suitable metal as aluminum and brass. Aluminum being hard to weld lends itself easily to embossing.

The rotor "A" has a single boss "C" embossed around the center of the axis of rotation at "G" which represents a spindle passing through the bosses and holding the plates parallel. The plates are assembled on the spindles with nuts over the end or by other means. The posts "D", "E" and "F" are not limited in numbers and hold the stationary plates "B" in the group. The bosses "C" are of uniform length and set off on the vertical posts a relative distance which is the length of the dielectric medium between the plates. Studs, bolts and other means may be passed through the bosses "C" and the group of plates assembled by nuts on the ends of bolts or by other means.

In the cross-section view of Fig. 2, the bosses "C" have the bottom of the cup wholly removed. The two essentials of condensers are plate area and the dielectric medium. The vertical post as "D" and the boss "C" on plate "B" provides for this. Each boss forms a foot having a toe "T" at the end of the boss and a heel "R" next to the plate. The toe "T" is broad, straight-sided and perpendicular to the plate. It is a continuation of the heel "R" which forms a sharp right angle with the plate. The toe of one foot on one plate rests on the under side of the next plate below the heel on that plate.

In Fig. 3 which is a modification of Fig. 2, the bottoms of the depressions "C" are partially removed. Both toes and heels of the bosses "C" are angular. Toes "T" and heels "R" are removed from the additional support of the bolt "D" and other means through the depression.

In Fig. 4 the circular bosses "C" are represented as flattened on one side. This flatness prevents the plates from rotating around the bolt which passes through the boss, at "D".

In Fig. 5 the circular depressions "C" are represented as square. Fig. 5 as well as Fig. 4 is for bosses which do not allow plates to rotate around a bolt or other means which must have a cross section corresponding in shape to that of the bosses and pass through the bosses for assembly and is particularly adapted to the rotor plates, "A".

Having described my invention the benefits to be obtained are as follows: the manufacture of condensers is simplified, less movable parts are used and the parts which remain are strengthened by being in single pieces. Also the electrical losses are minimized.

I claim:

1. In an electrical condenser, a plurality of metallic plates divided into two component groups, separated by a dielectric medium, provided with perpendicular bosses expanded from said plates, said bosses having modified and non-circular shapes.

2. In an electrical condenser, a plurality of metallic plates divided into two component groups, separated by a dielectric medium, provided with perpendicular bosses with regular flattened surfaces expanded from said plates, said bosses on one plate in one group having sufficient depth to inclose a dielectric medium between one plate and adjacent plates of the same group and means for assembling said plates together.

3. In an electrical condenser, a plurality of metallic plates divided into two component groups, separated by a dielectric medium, provided with perpendicular bosses with regular flattened surfaces expanded from said plates, said bosses on one plate in one group having sufficient depth to inclose a dielectric medium between said plates and adjacent plates of the component group.

JOHN J. AURYNGER.